March 18, 1958 V. L. CHAMPION 2,826,983
DOUGHNUT MACHINE
Filed Nov. 8, 1954 2 Sheets-Sheet 2
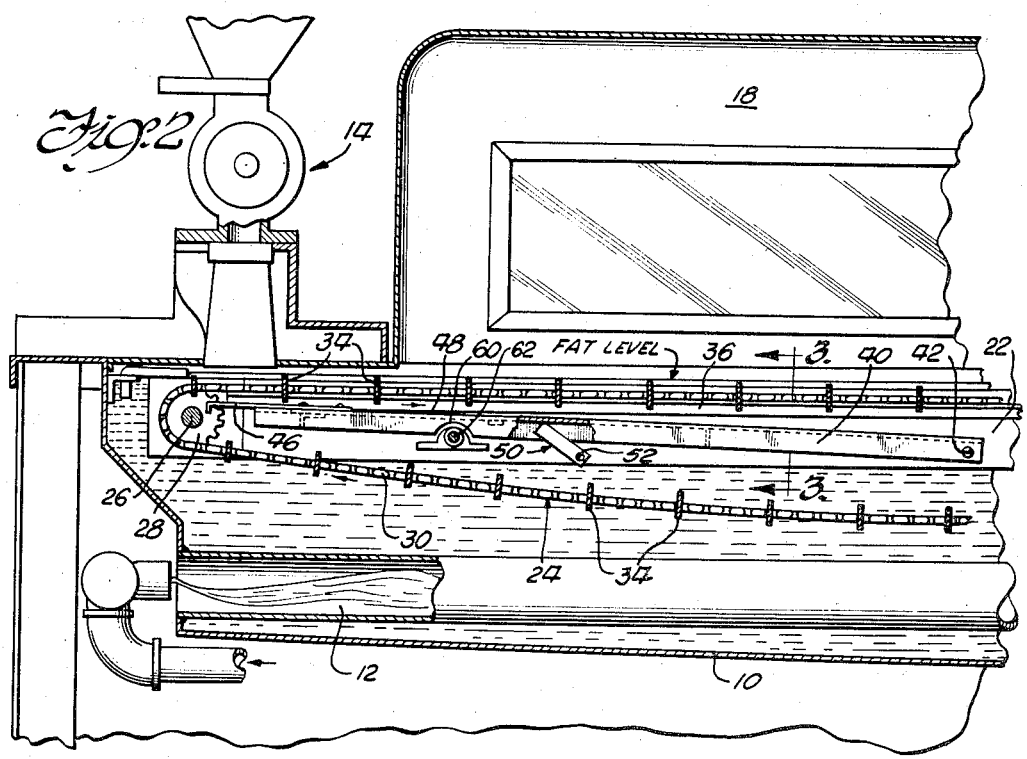
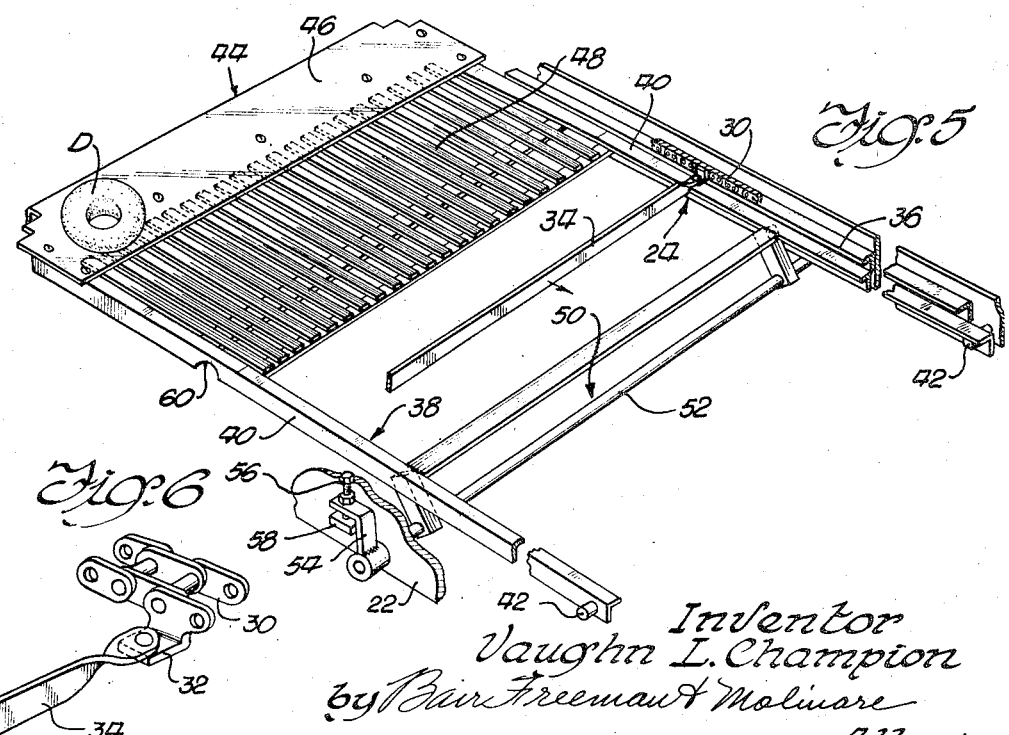
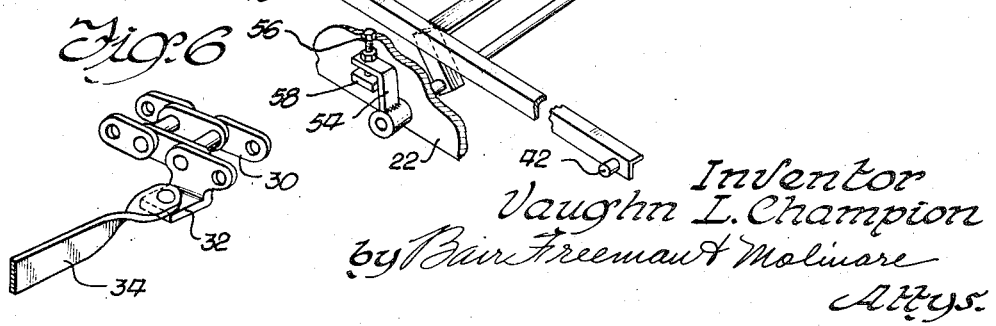
Inventor
Vaughn L. Champion
by Bair, Freeman & Molinare
Attys.

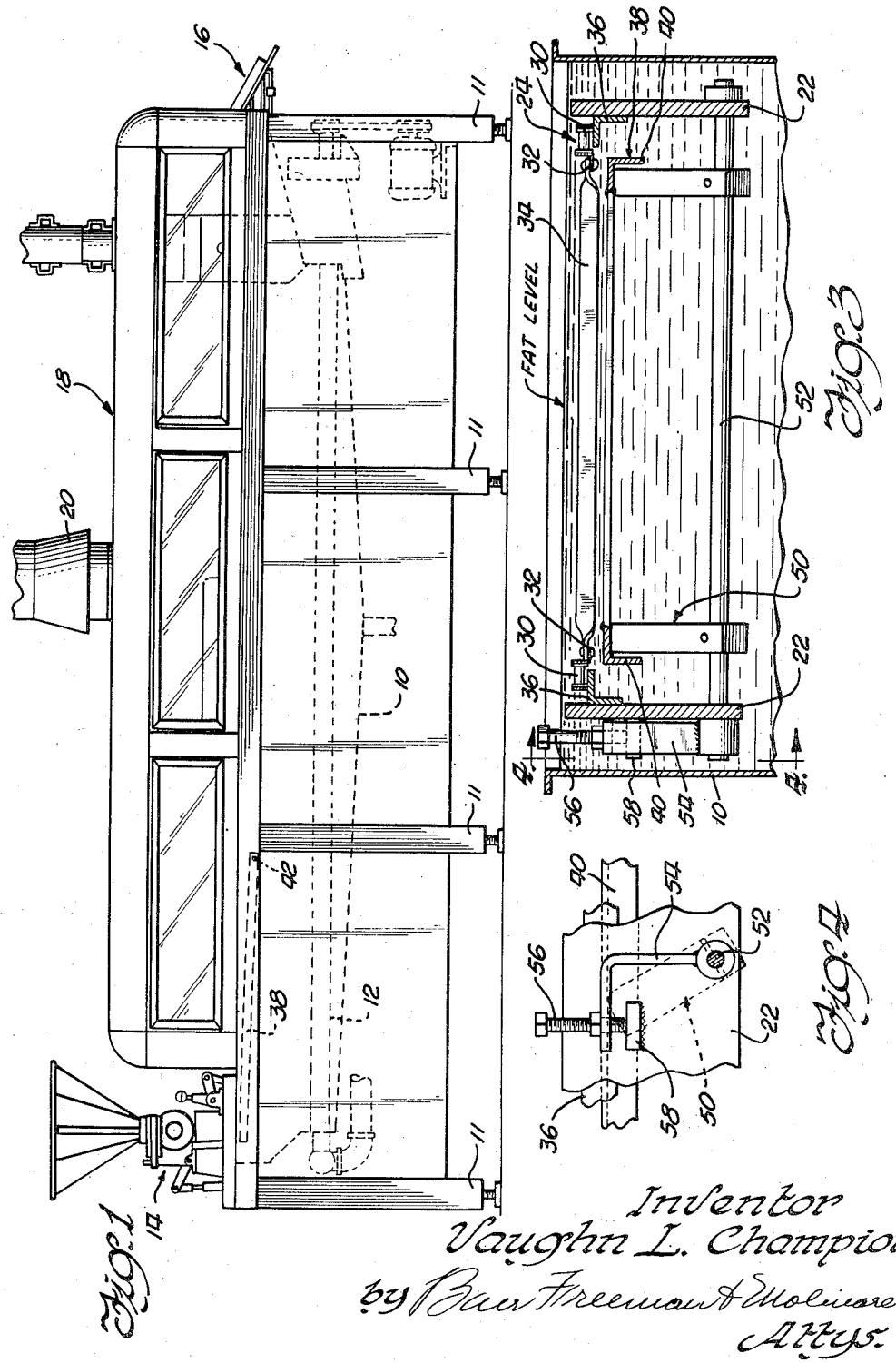

United States Patent Office 2,826,983
Patented Mar. 18, 1958

2,826,983

DOUGHNUT MACHINE

Vaughn L. Champion, Southport, Conn., assignor to The Petersen Oven Company, Franklin Park, Ill., a corporation of Illinois Application November 8, 1954, Serial No. 467,592

1 Claim. (Cl. 99—404)

This invention relates to a doughnut making machine and more particularly to a novel means for initiating the cooking of the doughnuts.

In the cooking of doughnuts, in order to produce light, fluffy doughnuts with the most desirable features, it is important that fat absorption by the uncooked dough be maintained as low as possible. Since the formed dough is to be cooked in fat, some fat absorption will always take place. The important thing is to keep the fat absorption low.

Until the outer surface of the dough is cooked, absorption of fat on the dough will take place. Furthermore, the speed of cooking of the outer surface of the dough is a function of the temperature of the fat. Thus, for fat that has been slightly chilled from its optimum cooking temperature, there is, first of all, a decrease in the speed of cooking of the outer surface of the dough; and, second, since the dough, with outer surface uncooked is in the fat a greater length of time, absorption of fat by the dough increases.

In automatic doughnut cooking machines the formed dough is first deposited by gravity onto a a drop-plate immersed in the hot cooking fat, and then the formed dough is advanced in the fat along the drop-plate by a conveyor, to make room for additional formed dough, until the doughnut has cooked sufficiently to float, whereupon the doughnut floats in the fat while it is being cooked and until it has been sufficiently cooked to be removed from the fat.

In such previous doughnut cooking machines, the fat above the drop-plate, into which the cold formed dough falls, is chilled relative to the remainder of the fat due to the fact that the previous formed dough that had been deposited was cold and because the drop plate obstructs convection currents in the fat that would tend to replace the chilled fat with fat at the optimum cooking temperature.

Accordingly, it is an object of this invention to provide a novel improved doughnut cooking arrangement which substantially obviates the above stated deficiencies found in existing doughnut cooking machines by reducing to a minimum the restriction by the drop-plate of convection in the fat.

Another object of this invention is to provide an improved drop-plate for doughnut cooking machines which permits, over the greater portion thereof, convection currents of fat therethrough so as to substantially eliminate the chilling of the fat above the drop-plate into which the cold, formed dough of the doughnuts is deposited.

A further object of this invention is to provide an improved drop-plate arrangement for use in doughnut cooking machines which permits circulation of fat therethrough so as to avoid the aforestated deficiencies of existing machines, which improved drop-plate is provided with novel means for adjusting the attitude of the drop-plate in the cooking fat.

In the practice of this invention, the large imperforate drop-plates of existing doughnut making machines are replaced by a drop-plate, wherein only the portion thereof for receiving the cold formed dough from the dough-forming means is imperforate, and the remainder of the drop-plate is foraminous, or of grill-like construction, so as to provide a support for the formed dough as it is advanced by the conveyor means through the fat, while also providing for circulation of the hot fat through and around the greater portion of the drop-plate, so as to substantially eliminate the possibility of the presence of chilled fat above the drop-plate into which the formed dough is to be deposited.

Further objects and advantages of this invention will become apparent as the following description proceeds and the features of novelty which characterize this invention will be pointed out with particularity in the claim annexed to and forming part of this specification.

A preferred embodiment of the invention is shown in the accompanying drawings, in which:

Figure 1 is a side elevation view of a doughnut cooking machine of the type which may be provided with the novel improvement of this disclosure.

Figure 2 is an enlarged cross-section view showing the positioning of the drop-plate of this invention in a doughnut cooking machine.

Figure 3 is a cross-section view taken on line 3—3 of Figure 2.

Figure 4 is an enlarged view taken on line 4—4 of Figure 3 and shows the details of the novel cam-type arrangement for adjusting the attitude of the drop-plate within the doughnut cooking machine.

Figure 5 is a perspective view of the novel drop-plate of this invention and shows the novel means for adjusting the attitude of said drop-plate within the doughnut cooking machine.

Figure 6 is a detail view of the connection of the conveyor flights to the chain-type conveyor used in the doughnut cooking machine.

Referring now to the drawings, there is shown a liquid-fat containing cooking tank 10 supported on legs 11 wherein the fat is maintained at the "Fat Level" indicated in Figures 2 and 3. The cooking tank is provided with gas-fired means for heating the fat, which gas-fired means includes a plurality of longitudinal burner tubes 12 running the length of the cooking tank.

Positioned above the cooking tank 10 at one end thereof is a dough-forming means generally indicated at 14. The formed dough is discharged from the dough-forming machine 14 into the fat within the cooking tank and the cooked doughnuts are taken from the other end of the cooking tank off the discharge chute 16.

Positioned above the cooking tank 10, over the greater portion of the length thereof, as best shown in Figure 1, is a hood 18 for capturing vapors and cooking fumes emitted from the hot fat. The hood is preferably provided with an exhust stack 20, as shown.

Mounted within the cooking tank 10, within the fat contained therein, is a framework, comprising a pair of elongated spaced frame members 22 which aid in the support of a conveyor means generally indicated at 24.

Journaled in said frame members 22 is a shaft 26 which carries a pair of sprockets 28 over which are trained conveyor chains 30. Certain links of the conveyor chains 30 have inwardly extending flanges 32 to which are attached flights 34. Figures 3 and 6 show the details of construction of the flights 34 which, at their ends, are twisted 90° to provide for securement of the flights 34 to the conveyor chain flanges 32.

The upper run of the conveyor chains 30 are adapted to pass over and be supported by angle-irons 36 which are appropriately secured to frame members 22. The greatest width of conveyor 24, between the outermost edges of the conveyor chains 30, is greater than the minimum dimension between the angle-irons 36 thus insuring that the conveyor 24 cannot slip below the tracks formed by frame members 22 and angle-irons 36.

Means (not shown) are provided for driving the conveyor 24 for movement in the direction of the arrows shown in Figure 2. It will be seen that the upper run of conveyor 24 moves from adjacent the end of tank 10, wherein the formed dough is deposited, toward the end of tank 10 from whence the cooked doughnuts are removed. The flights 34 of the conveyor thus serve to advance the doughnuts, as they are being cooked, from the entrance end to the exit end of the cooking tank 10.

Mounted in cooking tank 10 between the upper and lower runs of the conveyor 24 is a subframe 38 comprising a pair of elongated angles 40 which are pivoted adjacent one end thereof on spaced frame members 22 by means of pins 42. The sub-frame 38 carries a drop-plate or support means generally indicated at 44, which drop-plate includes an imperforate portion 46 and a foraminous, or grill-type, portion 48. As can best be seen in Figure 2, the drop-plate is arranged in cooking tank 10 so that the conveyor 24 passes thereover and so that the foraminous portion 48 of the drop-plate 44 extends from the imperforate portion 46 in the direction of movement of the conveyor 24 passing over the drop-plate 44.

Considering the measurement of length to be taken in the direction of movement of the conveyor 24, the imperforate portion 46 of the drop-plate is of relatively short length. Preferably, the length of imperforate portion 46 is as short as possible, but is at least as large as the maximum dimension of the formed dough to be deposited thereon. In Figure 5, there is shown the formed dough D lying on the imperforate portion 46 and it can be seen how the dimension of imperforate portion 46 is just large enough to support the formed dough D.

The length of the foraminous, or grill, portion 48 of the drop-plate 44 is greater than the said length of the imperforate portion 46 and is related to the speed of the conveyor 24 passing thereover so that by the time the doughnut that is being advanced by the conveyor 24 reaches the terminal end of the foraminous portion 48, the doughnut has been cooked sufficiently by the hot fat so that it will float in the fat. Thereafter, the floating doughnuts are advanced in the fat by the flights of the moving conveyor 24 toward the discharge end of the tank 10.

The foraminous, or grill, portion 48 permits circulation of the fat therethrough, thereby permitting convection currents to move the chilled fat down below the drop-plate 44 and to permit heated fat to replace the chilled fat. By making the imperforate portion 46 as short as possible, the resistance to circulation of the fat by the imperforate portion 46 is reduced to a minimum. The circulation of fat through the foraminous portion 48 and the movement of conveyor flights 34 over the imperforate portion 46 causes sufficient turbulence and movement of fat above the drop-plate 44 to substantially eliminate the problem of fat absorption heretofore existing.

In the particular construction shown, the foraminous, or grill, portion 48 is composed of a plurality of spaced parallel bars, rods, or slats extending longitudinally from said imperforate portion 46 in the direction of movement of the conveyor 24 passing thereover. Other constructions may be used for accomplishing the same ends, such as a flat plate having a plurality of holes punched therethrough.

Cam-type means are also provided for adjusting the attitude of the drop-plate 44 within the fat in the cooking tank 10. These cam-type adjusting means include a sub-frame engaging means 50 mounted on a rock shaft 52, and adapted to engage the underside of the sub-frame 38 at a point between the pivot pins 42 and the imperforate portion 46. The rock shaft 52 is journaled in the frame members 22. The means for pivoting rock shaft 52 includes a lever arm 54 attached to rock shaft 52 and carrying an adjustment screw 56 which engages an abutment 58 extending from one of the frame members 22. By manipulating the adjustment screw 56, the rock shaft 52 is caused to pivot and this causes the cam-type sub-frame engaging means 50 to pivot the sub-frame 38 about pins 42 to vary the attitude of the sub-frame 38 in the tank 10. This permits adjusting the height of the drop-plate 44 relative to the "Fat Level" within the tank 10.

As shown at 60, the sub-frame angle members 40 may be appropriately recessed to provide clearance for structural members such as cross bar 62 which give rigidity to the cooking tank 10.

Although I have herein shown and described a preferred embodiment of my invention, manifestly it is capable of modification and rearrangement of parts without departing from the spirit and scope thereof. I do not, therefore, wish to be understood as limiting this invention to the precise embodiment herein disclosed, except as I may be so limited by the appended claim.

I claim:

In a doughnut making machine of the type including a liquid fat containing cooking tank, and dough forming means positioned above the cooking tank; the improvement comprising, in combination, a pivotly mounted imperforate drop plate in said fat containing cooking tank below the level of fat and below said dough forming means, said drop plate being adapted to receive thereon formed dough which is moved by gravity from said dough forming means onto said drop plate, spaced-flight conveyor means positioned for movement through said cooking tank so that the flights thereof pass over said drop plate to move the formed dough resting thereon off from said drop plate, foraminous support means extending from said imperforate drop plate in the direction of movement of said conveyor means passing over said drop plate, said foraminous support means being operative to support the formed dough advanced by said conveyor and affording circulation of the fat around the formed dough supported thereon, said imperforate drop plate being of a dimension, in the direction of movement of said conveyor means, as small as possible but at least as large as the maximum dimension of the formed dough to be deposited thereon, said foraminous support means extending from said drop plate a sufficient distance, relative to the speed of said conveyor, for the formed dough to have cooked sufficiently, by the time it reaches the terminus of said foraminous support means, to float in said fat, and cam means operatively associated with said pivotly mounted drop plate and foraminous support means for selectively varying the height and slope of said drop plate and foraminous support means within said cooking tank.

References Cited in the file of this patent
UNITED STATES PATENTS

| | | |
|---|---|---|
| 1,823,146 | Hunter | Sept. 15, 1931 |
| 2,092,499 | Carpenter | Sept. 7, 1937 |
| 2,208,874 | Toews | July 23, 1943 |